June 2, 1936.                H. C. FAIRCHILD                2,042,983
                                 CAMERA
                          Filed Nov. 20, 1935           2 Sheets-Sheet 2

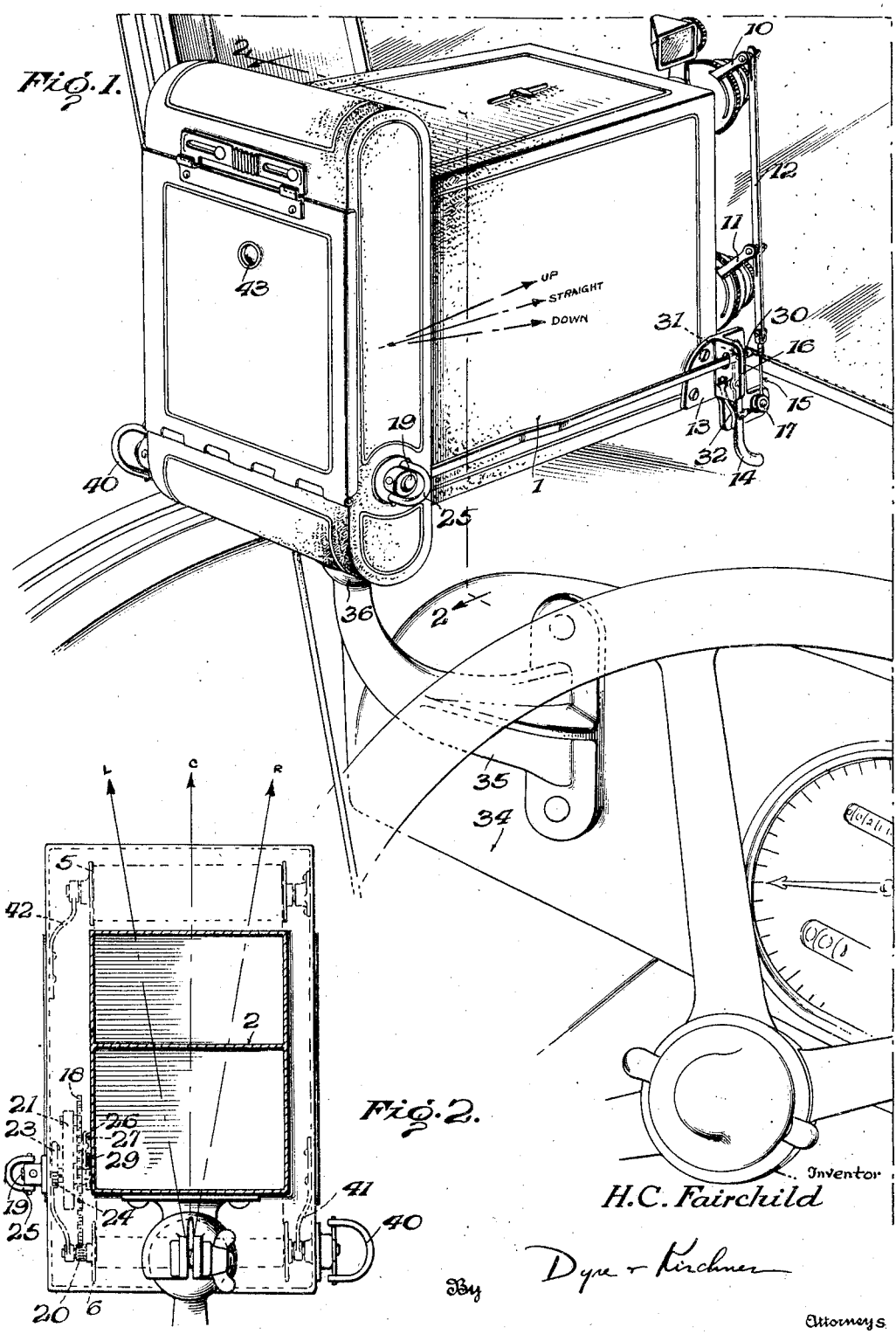

Inventor
H. C. Fairchild
By Dyre & Kirchner
Attorneys

Patented June 2, 1936

2,042,983

UNITED STATES PATENT OFFICE 2,042,983

CAMERA

Harry C. Fairchild, Elizabethton, Tenn.

Application November 20, 1935, Serial No. 50,783

10 Claims. (Cl. 95—18)

My invention relates to cameras and is believed to be broadly new, basic and pioneer in providing a camera having a plurality of lens means of differing characteristics arranged to project simultaneously on to a corresponding plurality of areas of a single sensitized surface an image of a given broad field and another image of part only of that field containing, or capable of enlargement to show, details of the broad field not discernible in the image thereof and not capable of being shown by enlargement of the image thereof.

The invention thus provides a camera by which two or any greater number of negatives can be produced on one integral sheet of film, plate, or other sensitized element, which will show together the relationship of several objects in a comparatively broad field and a detail of one of the objects taken at the same time. As an example, the objects shown may be one or more motor vehicles and the contiguous parts of a highway, and the detail may be the license plate of one of the vehicles. This suggests one of the uses to which the invention is admirably adapted to be put, as follows:

It is common knowledge that recklessness and carelessness in the operation of motor vehicles are the cause of a large proportion of the deaths, personal injuries and property damage which occur on streets and highways. That is to say, many, and probably most, of the so-called "accidents" in which one or more motor vehicles figure are not accidents in the strict sense at all but are directly attributable to wanton, and frequently criminal, negligence. Manifestly, if the fact of such negligence can be proved after the collision, responsibility can be fixed and the guilty party held accountable. Heretofore it has been frequently impossible so to fix responsibility because of the absence of unbiased witnesses and because often-times the parties themselves are not accurate in their observation and recollection of the facts on which responsibility depends. Hence, where two or more vehicles participate in a collision guilt and responsibility are disputed and for want of tangible, credible and unbiased evidence the party at fault frequently escapes being held accountable.

My invention provides a remedy by making it possible to produce a photographic record of one or more of the vehicles and their position and relation to each other, to the sides of the road and to other points and objects just prior to the collision and a companion photographic record, taken at the same time, of a part of one of the vehicles capable of identifying it beyond dispute, say a photograph of its license plate. Both photographic records are made simultaneously on contiguous areas of a single, integral plate or length of film; hence they show beyond dispute that the detail (the license number) comprising one of the views is part of the field shown in the other view.

It is plain that such a photographic record will render it futile for a guilty motorist to deny any fact which it shows, for example, the fact that his car was on the left side of the road, and that the motorist cannot successfully deny the identity of the vehicle made by the showing of the license number in the detail view.

While, of course, the present application for Letters Patent is concerned primarily with the structure of the camera for producing the record hereinabove indicated, and the mode in which the component parts of the camera function to produce that record, it is appropriate here to outline briefly the manner in which the camera is to be used.

I propose to have cameras made in accordance with the principles of the invention mounted on motor vehicles in such position that a photographic record of the field in front of a vehicle so equipped can be made instantly whenever probable necessity or desirability arises. In practice the record will be made when the driver of the vehicle equipped with the camera finds approaching him another vehicle under circumstances which suggest the possibility of a collision. Excessive speed alone is practically never the proximate cause of collisions between vehicles driven head-on; such collisions, including sideswiping, generally result from failure on the part of one driver to keep well on his right hand side of the road. While of course the camera which is the subject of this invention will not directly show the speed at which an approaching car is traveling, it will record the position of the car on the road, whether or not that position is the effect of loss of control due to excessive speed; and inasmuch as it is faulty and improper position on the road which is the proximate cause of most head-on collisions and sideswipings it will be evident that the photographic record will be effective to show incontrovertibly whether or not the driver of the car depicted by the record is responsible for the collision. Accordingly the driver of a car equipped with my camera will make exposures most generally when he is being approached by a vehicle which is not well over on its allotted side of the road.

Another important application of the invention is use of the camera by police and highway officers to record evidence of violations of traffic regulations. Motorists are apt to dispute charges of driving on the wrong side of the road, passing another vehicle proceeding in the same direction up a hill, parking in prohibited places or positions, and other violations which involve the absolute or relative locations of vehicles. Convictions are sometimes hard to obtain because of false protestations of innocence or honest mistake concerning the facts. The photographic record made as indicated herein provides tangible and indisputable proof of the facts and will show whether or not the driver of a particular vehicle, identified by its license number, actually committed the violation charged.

I know from actual trial and experiment that the photographic record described herein shows responsibility for damages sustained or the guilt or innocence of a party charged with a violation. In addition to these remedial effects, however, I anticipate important preventative benefits from any fairly widespread adoption and use of the camera in any community. I believe that general knowledge by motorists in such a community that the camera is installed on police cars and motorcycles and on some private vehicles will have the very desirable effect of deterring tendency to reckless driving and to the commission of traffic regulation violations.

As will be appreciated, the use of the invention suggested hereinabove contemplates mounting the camera on motor vehicles. A related use involves positioning the camera at strategic roadside points where accidents and violations are known to be likely to occur, such for example as at dangerous curves, congested intersections, etc.

The foregoing uses are suggestive merely and are set forth as showing certain important applications of the invention and certain meritorious objects which it can be used to attain. I wish it understood, however, that the camera which is the subject of the invention is capable of being put to other uses, to achieve other objects and advantages, and that therefore I do not limit the spirit of the invention or the scope of the appended claims to any utility of the camera or environment in which or circumstances under which it may be used.

An important feature of the camera contemplated by this invention consists in the use of a plurality of lens means of differing characteristics. One lens means may be of the common or standard type found in all ordinary cameras. It is designed to project an image of a relatively wide field, showing, for example, both sides of a roadway and all vehicles and persons on the roadway in the range within which an ordinary picture can be taken. The other lens means is of less usual construction and capacity, although old and well known in itself, and may be either one which is capable of projecting an image of part of the field of the companion lens means on a larger scale, i. e., capable of projecting a magnified image, or one which is capable of projecting an image with such sharper definition that the detail which it shows is sufficient with or without enlargement to identify the vehicle of which the detail forms a part. The broad principles of the invention thus require the use of at least two lens means of differing characteristics so that the images projected by the plural lens means in a very real sense complement each other, one taking up where another leaves off, one supplying what another lacks. It will be appreciated that the specific characteristics by which the lens means differ are immaterial as long as the images which they project thus complement each other. Practically, I prefer that one lens means be of the telephoto type which projects a magnified image of a relatively narrow field, but it will be evident from the foregoing that the invention in its broad aspects is not limited to embodiment in a camera in which one of the plural lens means is of the telephoto type.

A suggested and preferred embodiment of the invention which has been found satisfactory in actual use is shown on the accompanying drawings, in which Figure 1 is a perspective view of a camera made in accordance with the principles of the invention mounted in operative position on an automobile;

Fig. 2 is a vertical cross section on the line 2—2 of Fig. 1;

Figures 3, 4:
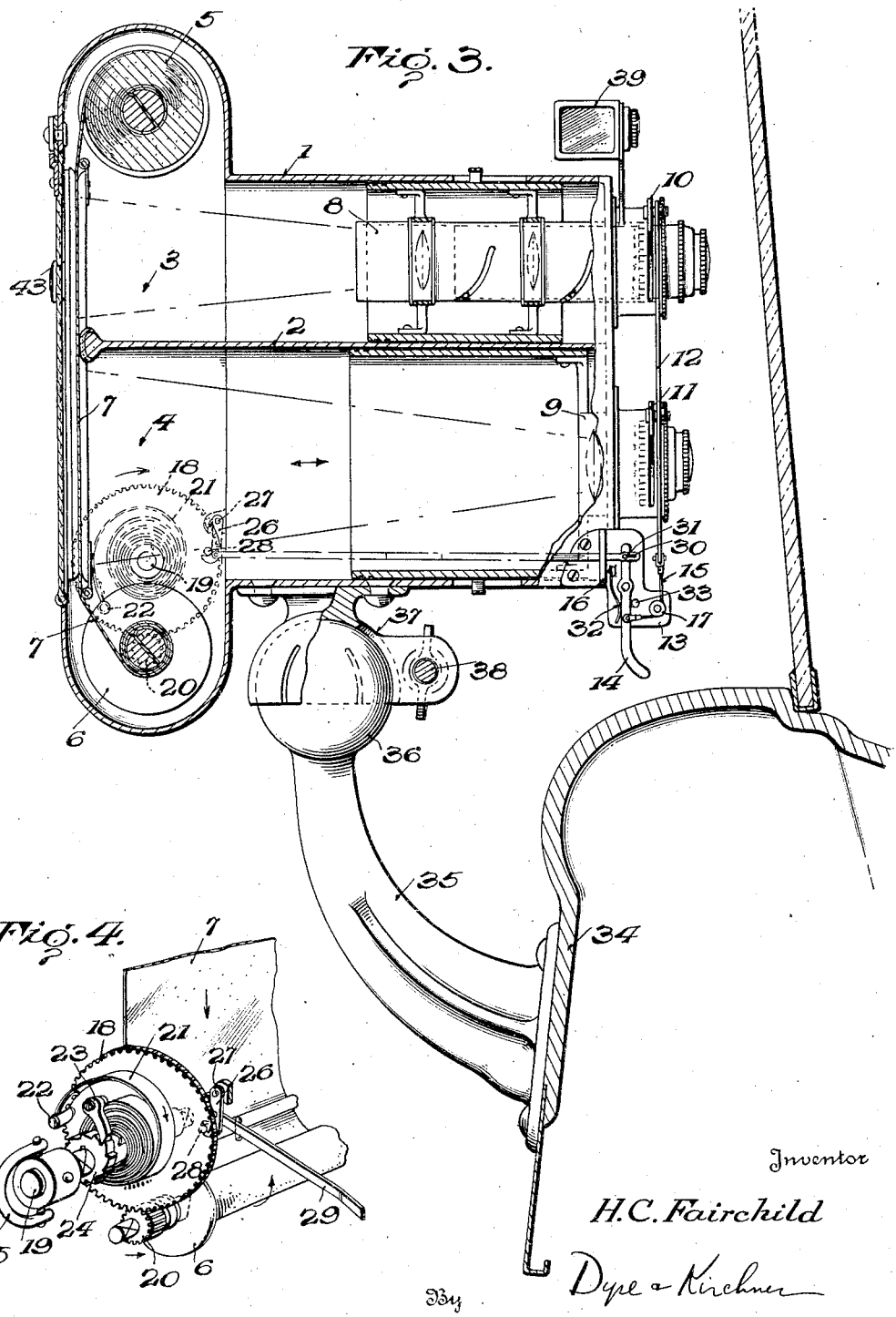
Fig. 3 is a vertical longitudinal section at a right angle to the section line of Fig. 2.
Fig. 4 is a detail perspective view of the film take-up spool and its controlling mechanism.

These figures are illustrative merely and are not to be taken as limiting the invention and the scope of the appended claims to the details of construction and design there shown.

Referring now to the drawings, the camera comprises a generally box-like and lightproof casing 1 divided by a separator 2, shown as a horizontal partition, into two compartments which will for convenience be called an upper chamber 3 and a lower chamber 4. At its rear the camera is provided with means for mounting a single sensitized sheet across the rear of both chambers, conveniently the supply spool 5 and the take-up spool 6 for the familiar celluloid film 7 and its paper backing. The film may be constrained by suitable guideways mounted on the rear end wall of the casing, and the spools may be journalled in enlargements of the top and bottom walls of the casing.

Each of the chambers has its front end closed by a barrel which conforms to and makes a snug fit with the chamber walls so that the connection is lightproof and each barrel can be moved independently in and out of its chamber to vary the distance between the film surface and the lens means mounted in the barrel. Any conventional gauge may be provided to show the settings of the barrels. In the illustration I have shown the upper chamber 3 smaller in cross sectional area than the lower chamber 4. The lens means mounted in the housing 8 therefor in the upper chamber differs in its characteristics from the lens means mounted in the housing 9 therefor in the lower chamber 4. The lens means in housing 8 is designed to project a detail image of the larger field the image of which is projected by the lens means in the housing 9. The differences between the two lens means have heretofore been explained.

Each lens means is provided with its own shutter which projects from the casing 1 in front of the lens barrel. These shutters are of standard type and the details thereof are therefore not shown. From each shutter an operating arm 10, 11 projects through a slot in the housing, and these arms are connected by a link 12 so that both shutters can be operated simultaneously by a pull on the link.

A bracket 13 is mounted on a lower front corner of the casing 1. This bracket provides a mounting for a pivoted trigger 14. A wire or equivalent flexible connection 15 connects the lower end of the link 12, extending below the lower shutter operating arm 11, and a point on the trigger below its pivot 16 so that when the trigger is retracted the link 12 is pulled down and the shutters operated. As will be evident from Figs. 1 and 3 a pin or roller 17 is mounted on the bracket to effectuate the necessary turn in direction of the wire 15 between its end which is connected to the link 12 and its end which is connected to the trigger 14.

It will be understood from the foregoing that manual operation of the trigger 14 simultaneously actuates the shutters of both lens means to project images simultaneously to different areas of the single sensitized film 7.

In order to bring new areas of the film 7 into the chambers 3 and 4 after an exposure, and to perform this shifting of the film quickly and automatically, I provide any convenient type of automatically operated film winding mechanism. A satisfactory type of such mechanism which is preferred because of its simplicity is shown in the illustrated embodiment of the invention. It comprises a spring motor for the take-up spool 6 in combination with means responsive to movement of the trigger 14 for placing the spring motor in operation for a predetermined period of rotation. The parts are so proportioned and adjusted that this predetermined rotation is sufficient to shift the film just enough, or a little more than enough, to remove the exposed areas from the chambers 3 and 4 and bring new areas into the chambers in position for the next exposure.

As shown, the means for accomplishing this function comprises a gear 18 loose on the shaft 19 and meshing with a pinion 20 fast on the take-up spool 6. A coiled ribbon spring 21 has its outer end looped around a post 22 near the periphery of the gear 18 and its inner end fast on the shaft 19. A pawl 23 is pivoted to the adjacent wall of the camera casing 1 and rides between the teeth of a ratchet wheel 24 fast on the shaft 19. A key 25 is provided on the end of the shaft 19 which projects from the casing 1 so that rotation of the key in the single direction permitted by the pawl 23 serves to wind up the spring and bias the gear 18 to move in a clockwise direction as viewed in Fig. 4. A hooked pawl 26 hangs from a pivot 27 carried by the adjacent wall of the casing 1 or a bracket mounted thereon, and the hooked end of this pawl normally holds a pin 28 carried by that face of the gear 18 which is opposite the face carrying the spring 21. When the pawl 26 holds the pin 28 the spring 21 may be wound up while the gear 18 is held against rotation. Release of the pawl 26 from holding engagement with the pin 28 permits the energy stored in the spring 21 to rotate the gear 18, and since this gear meshes with the pinion 20 the take-up spool 6 rotates in a counterclockwise direction as long as rotation of the gear 18 continues.

A link 29 has one end connected to the pawl 26 and is extended from a slot in the enlargement of the casing 1, which houses the take-up spool 6. The other end of the link 29 is slotted, as shown at 30, to receive a pin 31 on the arm of the trigger 14 which is on the side of the pivot 16 opposite the lower depending end of the trigger. Upon actuation of the trigger therefore, against the leaf spring 32 which is mounted on the bracket 13 to urge the lower arm of the trigger forwardly against the stop 33, pin 31 begins to move forwardly in the slot 30. Before it reaches the end of the slot, the downward movement of the link 12, which begins with the beginning of the trigger movement, has operated the shutters of the two lens means. After such shutter actuation continued movement of the trigger in the same backward direction brings the pin 31 to the end of the slot 30 to pull the link 29 and swing the pawl 26 to release the pin 28 therefrom. Gear 18 is then free to rotate under the influence of its spring 21 and the take-up spool 6 thereupon rotates to wind up the film 7. The operator pulls back on the trigger 14 momentarily only. As soon as the trigger is released leaf spring 32 restores it to position against the stop pin 33, and pin 31 moves back in the slot 30 to restore pawl 26 to its initial position in the path of movement of the pin 28. A single rotation only is thus permitted the gear 18, and the parts are so proportioned and designed that one rotation of this gear will drive the take-up spool 6 just enough, or somewhat more than enough, to remove the exposed areas of the film 7 from the chambers 3 and 4 and bring new areas of the film into the chamber for the succeeding exposure.

It is apparent therefore that the trigger 14 controls mechanism which opens the shutters simultaneously during the first part of the trigger movement in one direction and immediately thereafter, during the succeeding movement of the trigger in the same direction, automatically shifts the film to bring new areas into position for the next exposure. Manifestly other means, differing from the construction shown, may be used to accomplish this result, and the specific trigger and appurtenant mechanism which I have shown and described in the illustrated exemplification of the invention therefore forms no part of the broad principles of the invention.

As will be understood from the introductory part of the specification an important use of the camera involves its mounting on motor vehicles. To provide for an easily adjusted and simple mounting, I may use a ball and socket connection between the camera and a bracket fixed to some part of the vehicle, as for example the cowl or instrument board 34. In the drawings I show a bracket post 35 rising from the cowl or instrument board 34 terminating in a ball 36 over which is received a split socket 37 secured to the bottom wall of the camera. The socket is provided with parallel ears through which a thumb nut 38 passes, manipulation of which varies the pressure and friction of the socket on the ball to make the camera easily adjusted and enable its lens means to be trained on any desired field. The usual finder 39 is mounted on the top of the casing 1 to assist in properly training the camera.

A key 40 projects from the casing wall and is movable into and out of engagement with the take-up spool 6. The key is manually turned in initially threading the film around the spool. Both spools are made removable from the casing by making at least one of the bearings for each spool a spring pressed and movable bearing. These movable bearings are shown in Fig. 2 at 41 for the take-up spool and at 42 for the supply spool.

It is believed that the manner in which the described parts operate will be evident from the foregoing description. Having threaded a film 7 through the chambers 3 and 4 until the index indicating a proper positioning of the first exposure area can be seen through the peep window 43 in the hinged or removable plate in the rear wall of the casing 1, the camera is ready to be trained on any desired field. Both lens means are originally mounted in such relation to each other that they are trained on the same field, the lens means in the barrel 9 being adapted to project an image of the whole of such field, and the lens means in the barrel 8 being adapted to project an image of a detail of that field. The camera may normally be adjusted to its bracket mounting 35 in such manner that the field of both lens means is the area of roadway directly ahead of the vehicle. If the operator desires to make a photographic record of a field lying before him on a straight portion of roadway no further adjustment of the camera need be made. It is only necessary to pull the trigger once and release it. A second set of exposures may be made promptly thereafter by a second pull and quick release of the trigger. If the field of which a photographic record is to be made lies somewhat above or below the plane of the vehicle, or somewhat to the right or left side of its axis, a preliminary adjustment in the mounting of the camera may have to be made. This can be readily done merely by grasping the casing of the camera and forcing it bodily through the friction fit of the ball 36 and socket 37.

Much of the structure of the illustrated embodiment herein described is matter of design only and as such it is to be distinguished from the essential functional relationships which characterize the broad invention as defined in certain of the appended claims. However, while such design features can be varied without destroying the identity of the essential invention, many of them are considered novel, useful and inventive per se, and as such they are made the subject of some more specific claims.

I claim:

1. A camera adapted to expose simultaneously plural areas of a single sensitized surface including means mounting a single sensitized sheet, a plurality of lens means of differing characteristics focused on different areas of said sheet, one of said lens means being adapted to project the image of a relatively broad field and another being adapted to project the image of part only of said field, a shutter for each lens means, means for simultaneously operating each shutter, and means for moving the single sensitized sheet to bring succeeding plural areas thereof within the focus of the several lens means respectively after each simultaneous shutter operation.

2. A camera adapted to expose simultaneously plural areas of a single sensitized surface including means mounting a single sensitized sheet, a plurality of lens means of differing characteristics focused on different areas of said sheet, one of said lens means being adapted to project the image of a relatively broad field and another being adapted to project a relatively sharper image of part of said field, a shutter for each lens means, means for simultaneously operating each shutter, and means for moving the single sensitized sheet to bring succeeding plural areas thereof within the focus of the several lens means respectively after each simultaneous shutter operation.

3. A camera adapted to expose simultaneously plural areas of a single sensitized surface including means mounting a single sensitized sheet, a plurality of lens means of differing characteristics focused on different areas of said sheet, one of said lens means being adapted to project the image of a relatively broad field and another being adapted to project the image of part only of said field, said latter image being inherently capable of greater enlargement than said first named image to show details of said first named image not discernible therein, a shutter for each lens means, means for simultaneously operating each shutter, and means for moving the single sensitized sheet to bring succeeding plural areas thereof within the focus of the several lens means respectively after each simultaneous shutter operation.

4. A camera adapted to expose simultaneously plural areas of a single sensitized surface including means mounting a single sensitized sheet, a plurality of lens means of differing characteristics focused on different areas of said sheet, one of said lens means being adapted to project the image of a relatively broad field on a relatively small scale and another being adapted to project the image of part only of said field on a larger scale, a shutter for each lens means, means for simultaneously operating each shutter, and means for moving the single sensitized sheet to bring succeeding plural areas thereof within the focus of the several lens means respectively after each simultaneous shutter operation.

5. A camera adapted to expose simultaneously plural areas of a single sensitized surface comprising means mounting a single sensitized sheet including a sheet take-up spool, a pinion thereon, a spring biased gear meshing with said pinion, a stop for the gear, a plurality of lens means of differing characteristics focused on different areas of said sheet, a shutter for each lens means, and a single manually operable means for actuating said shutters simultaneously and thereafter releasing said stop.

6. A camera adapted to expose simultaneously plural areas of a single sensitized surface including means mounting a single sensitized sheet, a plurality of lens means of differing characteristics focused on different areas of said sheet, one of said lens means being adapted to project the image of a relatively broad field and another being adapted to project the image of part only of said field, means for focusing said lens means, a shutter for each lens means, means for simultaneously operating each shutter, and means for moving the single sensitized sheet to bring succeeding plural areas thereof within the focus of the several lens means respectively after each simultaneous shutter operation.

7. A camera adapted to expose simultaneously plural areas of a single sensitized surface including means mounting a single sensitized sheet, a plurality of lens means of differing characteristics focused on different areas of said sheet, one of said lens means being adapted to project the image of part only of said field, independent means for focusing each of said lens means, a shutter for each lens means, means for simultaneously operating each shutter, and means for moving the single sensitized sheet to bring succeeding plural areas thereof within the focus of the several lens means respectively after each simultaneous shutter operation.

8. A camera adapted to expose simultaneously plural areas of a single sensitized surface including means mounting a single sensitized sheet, a plurality of lens means of differing characteristics focused on different areas of said sheet, a shutter for each lens means, and a single manually operable means for actuating said shutters simultaneously and thereafter moving said single sensitized sheet, to bring succeeding plural areas thereof within the focus of the several lens means respectively after each simultaneous shutter operation.

9. A camera adapted to expose simultaneously plural areas of a single sensitized surface including means mounting a single sensitized sheet, a plurality of lens means of differing characteristics focused on different areas of said sheet, a shutter for each lens means, and a single manually operable means arranged to actuate said shutters simultaneously during the first part of its movement and thereafter to move said single sensitized sheet during a succeeding part of its movement, to bring succeeding plural areas thereof within the focus of the several lens means respectively after each simultaneous shutter operation.

10. A camera adapted to expose simultaneously plural areas of a single sensitized surface comprising means mounting a single sensitized sheet including a spring biased take-up spool, a plurality of lens means of differing characteristics focused on different areas of said sheet, a shutter for each lens means, and a single manually operable means for actuating said shutters simultaneously and thereafter releasing said take-up spool for a predetermined rotation, to bring succeeding plural areas of said single sensitized sheet within the focus of the several lens means respectively after each simultaneous shutter operation.

HARRY C. FAIRCHILD.